(12) United States Patent
Kemmler et al.

(10) Patent No.: US 8,694,559 B2
(45) Date of Patent: Apr. 8, 2014

(54) USING DATABASE CONTENT FOR MULTIPLE BUSINESS DATA SYSTEMS CONNECTED TO ONE DATABASE

(75) Inventors: Andreas Kemmler, Bonnigheim (DE); Torsten Kamenz, Wiesloch (DE)

(73) Assignee: SAP AG, Walldorf (DE)

( * ) Notice: Subject to any disclaimer, the term of this patent is extended or adjusted under 35 U.S.C. 154(b) by 84 days.

(21) Appl. No.: 13/548,796

(22) Filed: Jul. 13, 2012

(65) Prior Publication Data

US 2014/0019410 A1    Jan. 16, 2014

(51) Int. Cl.
*G06F 17/30* (2006.01)

(52) U.S. Cl.
CPC .... *G06F 17/30595* (2013.01); *G06F 17/30292* (2013.01); *G06F 17/30557* (2013.01); *G06F 17/30607* (2013.01)
USPC ........... 707/803; 707/736; 707/756; 707/802; 707/804; 707/805; 707/806; 707/807; 709/201; 709/203; 709/213; 709/217

(58) Field of Classification Search
CPC .................... G06F 17/30595; G06F 17/30292; G06F 17/30557
USPC .......... 707/136, 756, 802–807; 709/201, 203, 709/213, 217
See application file for complete search history.

(56) References Cited

U.S. PATENT DOCUMENTS

| | | | |
|---|---|---|---|
| 5,737,591 A * | 4/1998 | Kaplan et al. ........................ | 1/1 |
| 7,389,304 B2 * | 6/2008 | Boyer et al. ......................... | 1/1 |
| 7,478,102 B2 * | 1/2009 | Ellis et al. ............................. | 1/1 |
| 8,239,423 B2 * | 8/2012 | Gitai et al. .................... | 707/803 |
| 2005/0102262 A1 * | 5/2005 | Nuebling .......................... | 707/1 |
| 2006/0136804 A1 * | 6/2006 | Boyer et al. .................. | 715/500 |
| 2007/0156740 A1 * | 7/2007 | Leland et al. ................. | 707/102 |
| 2007/0185898 A1 * | 8/2007 | Hekmatpour et al. ........ | 707/102 |
| 2008/0184109 A1 * | 7/2008 | Boyer et al. .................. | 715/255 |
| 2010/0192057 A1 * | 7/2010 | Majidian ..................... | 715/237 |
| 2010/0332510 A1 * | 12/2010 | Gitai et al. ................... | 707/759 |

* cited by examiner

*Primary Examiner* — Frantz Coby
(74) *Attorney, Agent, or Firm* — Fountainhead Law Group PC (57) ABSTRACT

A data model specific to a database schema is received in a database system. The received data model may be applied to a first instance of the database schema to generate a data view of the first database schema. The received data model may be applied to a second instance of the database schema to generate a second data view of the second database schema.

20 Claims, 5 Drawing Sheets

USING DATABASE CONTENT FOR MULTIPLE BUSINESS DATA SYSTEMS CONNECTED TO ONE DATABASE

BACKGROUND

Unless otherwise indicated herein, the approaches described in this section are not prior art to the claims in this application and are not admitted to be prior art by inclusion in this section.

Consolidating the various data systems in a business enterprise (or any other organization) into a centralized data system is increasingly common. For example, the SAP HANA® database product provides advanced database technology such as an in-memory database engine that can allow the enterprise to store its most relevant data in main memory which enables analytics to be performed directly in the database.

However, an enterprise may maintain separate duplicate data systems for some of their operations. For example, a data system for facilities (e.g., manufacturing, sales, etc.) in the U.S. may be maintained separately from corresponding data system for facilities in Europe. Providing a set of data for each of the two data systems in a centralized data system may be implemented by creating multiple instances of a database schema for the separate data systems. Data modeling, however, then becomes a challenge because a data model is typically specific to a database schema. Managing multiple separate copies of a data model for each database schema can be time consuming from a development point of view and can be error prone when new versions of the data model become available and new copies need to be redeveloped.

DETAILED DESCRIPTION

Disclosed embodiments relate to the modeling of multiple instances of a database schema using the same data model to produce respective data views for each instance. In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

Figure 1:
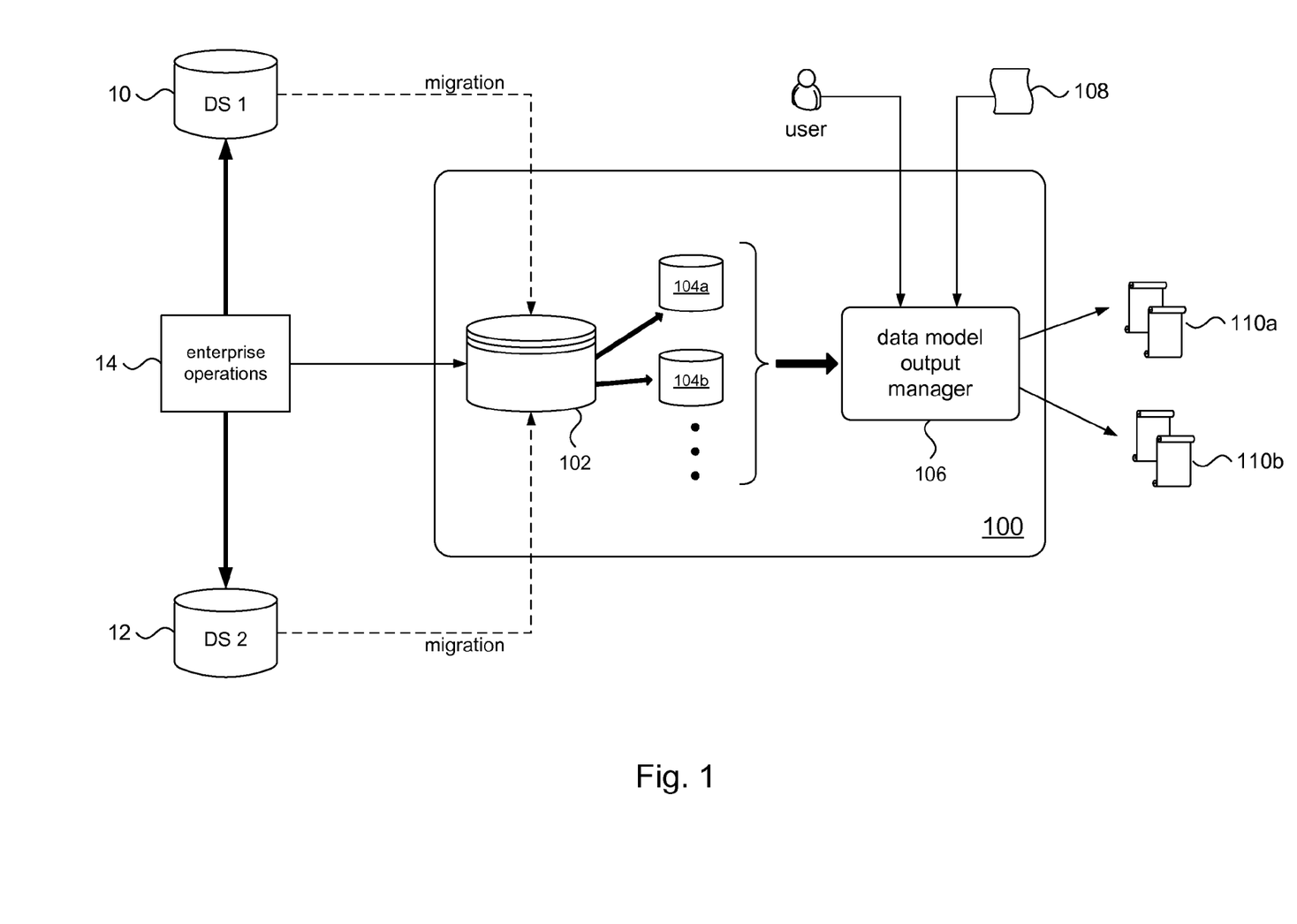
FIG. 1 shows an illustrative embodiment of a database system in accordance with the present disclosure.

FIG. 1 shows a database system 100 in accordance with embodiments of the present disclosure. The database system 100 may comprise a database 102. One or more database schema instances ("database schemas") 104a, 104b may be defined in the database system 100. A data model output manager 106 may be provided to allow a user to query the received data model 108 to generate reports, result tables, and other output 110a, 110b.

The figure illustrates a configuration where the database system 100 is installed in an enterprise (customer) to enhance or eventually replace the data systems of the enterprise. For example, the enterprise may have pre-existing (legacy) currently operating data systems 10 and 12. Typical data systems in an enterprise, for example, include enterprise resource planning (ERP), customer relationship management (CRM), human capital management (HCM), and so on. Portions of the data systems 10, 12 may be migrated over, or in some situations replicated, to the database system 100. As data continues to be generated from the various operations 14 in the enterprise (e.g., sales, manufacturing, etc.), the data may continue to feed into the pre-existing data systems 10, 12. For the data that has been migrated (or replicated), data from the enterprise operations 14 may feed into the database system 100. For example, the data may be stored in database schemas 104a, 104b which may represent portions of respective data systems 10, 12 that have been migrated to the database system 100.

In some embodiments, a provider may provide data modeling services to support users of the database system 100. For example, the provider may provide data models 108 to model the data contained in database schemas 104a, 104b. In some embodiments, the data model output manager 106 may receive a data model 108 and, using the received data model, query the data model to extract data (e.g., result tables 110a) from the database schema (e.g., 104a). In a particular embodiment, for example, the database system 100 may be a SAP HANA® database product developed and sold by SAP, Inc. SAP support teams may provide data models call HANA Content Packages to the customer to model the data in database schemas defined in the database system 100.

As is conventionally understood, a "database schema" is a specification that defines an organization of data. For example, the data may be organized into a set of data tables (e.g., "Customer Information", "Product Information", etc.) that are called out in the specification. Each data table may have table fields (e.g., "customer ID", "customer address", "product ID", etc.), field attributes, and so on which are stored in the specification. The specification may be stored in a file called a data dictionary.

A user may create an "instance" of a database schema. For example, when a database schema has been instantiated, the database system 100 may create instances of the data tables (e.g., "Customer Information", "Product Information", etc.) defined in the database schema; e.g., by creating a set of data files in the database system. The data table instances may then be populated with actual data (e.g., from the enterprise's data systems or operations such as sales, manufacturing, etc.) in accordance with the organizational scheme defined by the database schema.

In most contexts, the term "database schema" may be understood to refer to an "instance" of the database schema, because in most cases one speaks of specific instances of a database schema rather than the data organization itself. For example, 104a, 104b in FIG. 1 represent instances of a database schema. Accordingly, the phrase "database schema" will be understood as referring to instances of the database schema rather than referring to the organization of the data. If "database schema" is intended to refer to the organization of the data itself, that intention will be made explicit.

Multiple instances of the same database schema may be created in a database system. An example of how this can happen may be provided by the configuration shown in FIG.

1. Suppose, for example, the enterprise uses an ERP system to manage the flow of information among its various business operations, and that the enterprise has deployed a copy of the ERP system in the U.S. as data system 10 and another copy in Europe as data system 12. Suppose further that the enterprise has migrated its sales data from each ERP data system 10, 12 to the database system 100. The enterprise may want to keep the U.S. sales data separated from the European sales data. To do this, a user may define a database schema in the database system 100 which duplicates the data organization that is used to store sales data in the ERP data systems 10 and 12. The user may then create a first instance 104a of the database schema for U.S. sales by migrating the sales data from ERP data system 10 into the first instance. The user may also create a second instance 104b of the database schema for European sales by migrating the sales data from ERP data system 12 into the second instance. Database schemas 104a, 104b represent multiple instances of the same database schema.

Continuing with FIG. 1, in accordance with principles of the present invention, the data model output manager 106 may generate separate data views for each of the multiple instances 104a, 140b of the database schema using the same data model. For example, the data model output manager 106 may use data model 108 in a first data view (not shown) to allow a user to generate reports and other output tables 110a from data contained in database schema 104a using the first data view. The data model output manager 106 may use the same data model 108 in a second data view (not shown) to allow a user to generate other output 110b from data contained in database schema 104b using the second data view. This aspect of the present disclosure will be discussed in more detail below.

Figure 2:
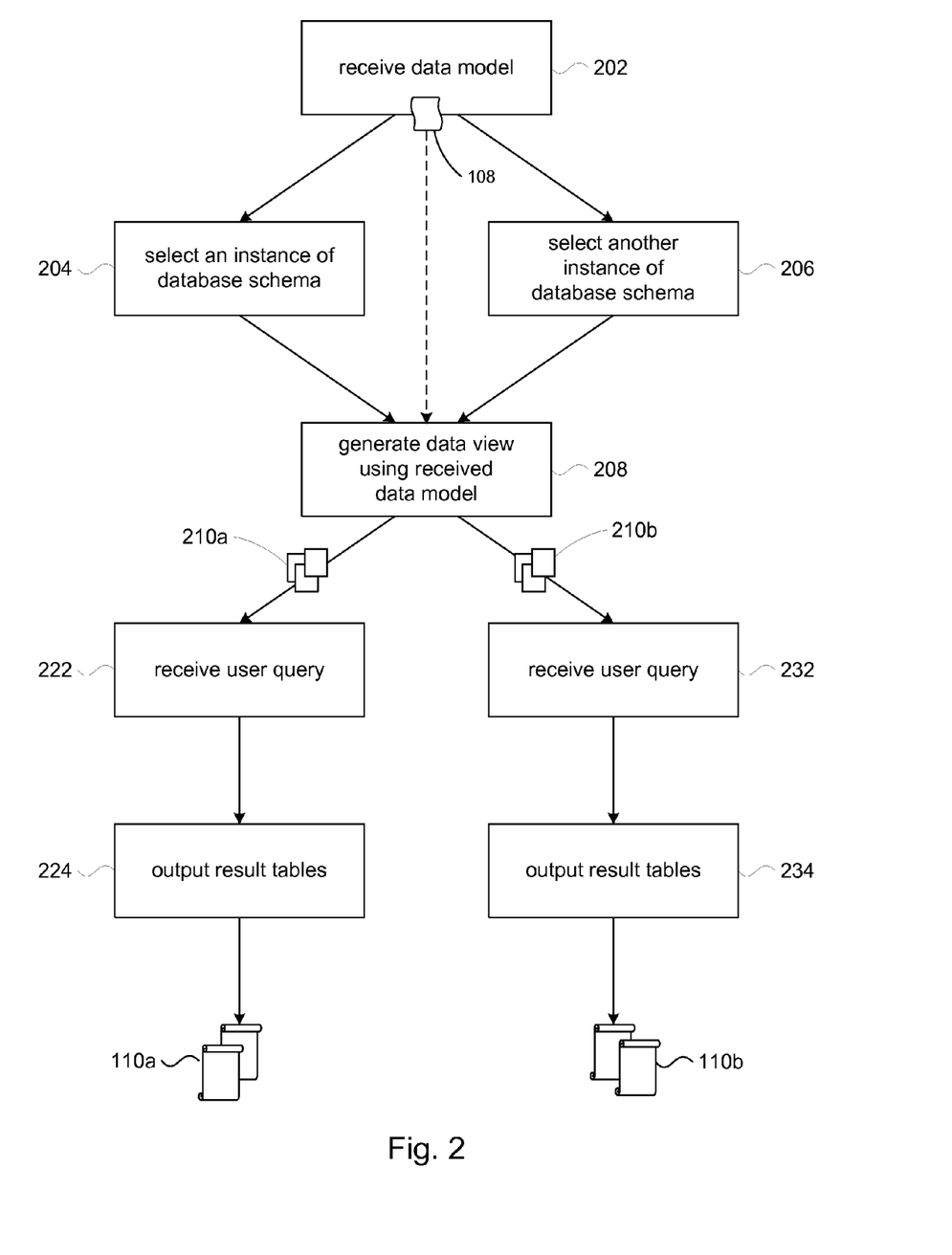
FIG. 2 shows a general process flow for generating data views.

Referring now to FIG. 2, a general workflow in database system 100 according to the present disclosure is shown. The workflow may begin in a process block 202, where the database system 100 receives a data model 108 into the database system 100. In some embodiments, the data model 108 may specify database operations (e.g., JOIN, SELECT, AVERAGE, etc.) to be performed on data tables and table fields comprising a given database schema. The data model 108, for example, may be provided from a development group within the enterprise, from a third party provider, and so on.

In accordance with the present disclosure, the data model 108 may be used to model each instance of the database schema from among multiple instances. For example, in a process block 204, a user may select an instance (e.g., 104a) of the database schema to be modeled; for example, by specifying the name of the instance. In some embodiments, a user interface may display a list of database schema instances to choose from.

In a process block 208, the data model output manager 106 may generate a data view 210a using the data model 108 received in process block 202. The data view 210a may then be queried by the user. For example, in step 222, one or more queries (e.g., SELECT) may be received from the user and in step 224 results 110a from the query may be output to the user; e.g., on a display, printed out, and so on. A data view contains the information which specifies a "view" (e.g., tables, graphs, reports, etc.) of stored data. A data view specifies which tables to be access, which fields of these tables, etc. The data view may be accessed via an SQL select statement to return data, for example, in a data table referred to as a "result table". The result table may be presented to the user, for example, on a display. A data view is typically persisted (e.g., stored in a data store), while result tables are typically transient (e.g., displayed on a monitor), but may be printed (e.g., reports).

Another user may want to model another instance of the database schema using the same data model 108. Accordingly, in a process block 206, the other user may select another database schema (e.g., 104b) to be modeled. Process block 208 may be invoked to cause the data model output manager 106 to generate a second data view 210b using the data model 108 received in process block 202. The user may then query the second data view 210b (in a step 232) to produce various output 110b (in a step 234).

Figure 3:
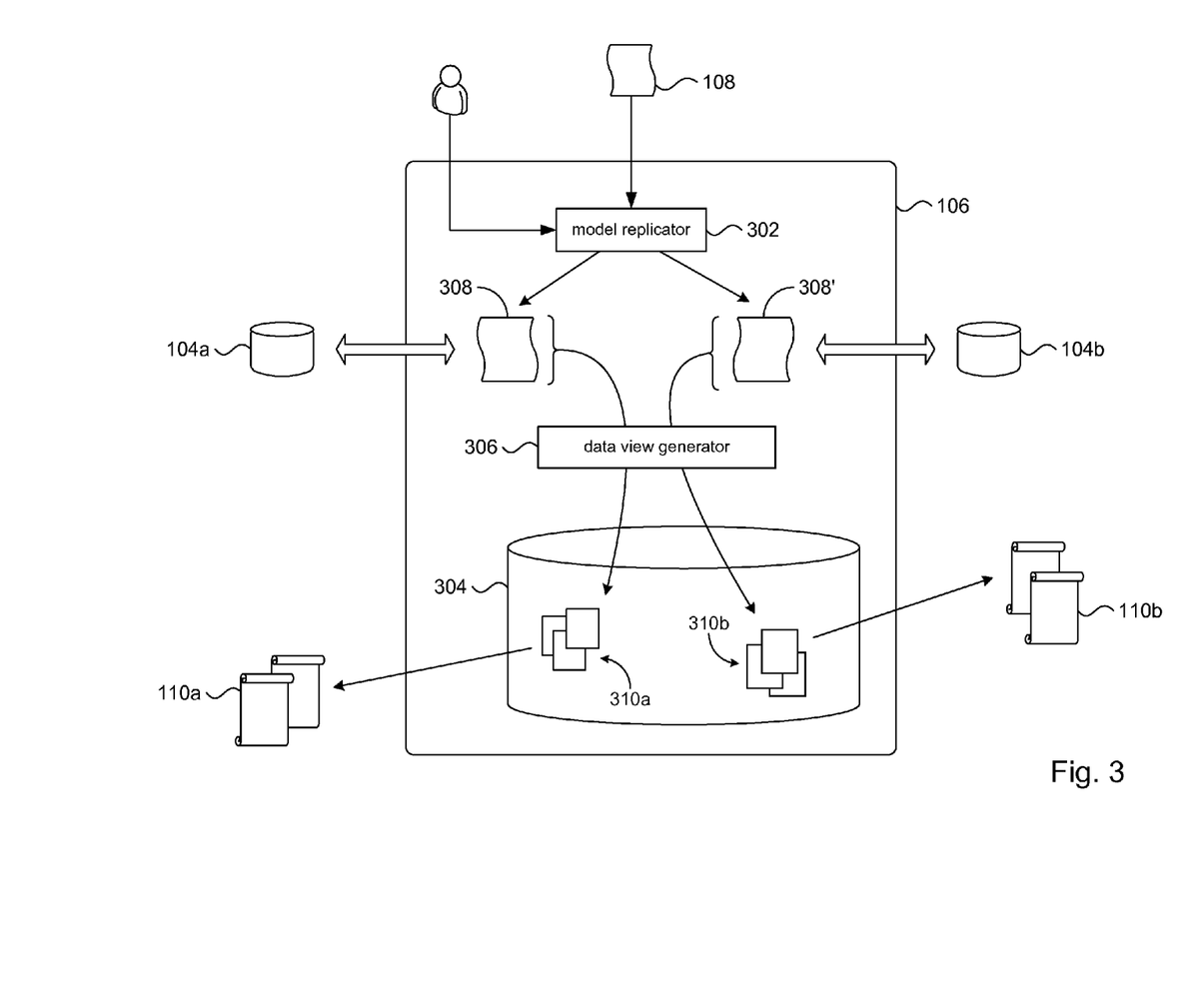
FIG. 3 shows an embodiment of a data model output manager for generating data views against multiple instances of a database schema using the same data model.

Referring to FIG. 3, in some embodiments, the data model output manager 106 may comprise a model replicator 302, internal copies 308, 308' of the data model 108, a data view generator 306, and a database schema 304. The data model 108 may designate a specific instance of a database schema (e.g., 104a) in the database system 100. When the data model output manager 106 receives the data model 108, the model replicator 302 may save the received data model as data model 308 and associate the received data model with the designated database schema 104a.

In accordance with principles of the present disclosure, the model replicator 302 may produce a data model copy 308' of the received data model 108 and associate the copy with another instance of the database schema (e.g., 104b). In some embodiments, as many copies of the received data model 108 may be produced as there are instances of the database schema being modeled.

The model replicator 302 may perform refactoring of the data model copy 308'. For example, the received data model 308 may refer to data tables in database schema 104a as the source of data for the data model. However, the data tables in database schema 104b will be named slightly differently. Accordingly, refactoring of the copy 308' may be performed so that the data table references in the copy point to the corresponding data tables in database schema 104b. For example, the names of the data tables in database schema 104a are the same as the names of the data tables in database schema 104b. However, the full technical name of a data table in a given database schema includes the name of the database schema to which the data table belongs; e.g., SCHEMA1.TABLE1 may be the full technical name of TABLE1 in database schema SCHEMA1, and the same data table in a copy of SCHEMA1, called SCHEMA2, would have a full technical name of SCHEMA2.TABLE1. Accessing a data table requires the full technical name; hence:

Select From SCHEMA1.TABLE1 . . .

or

Select From SCHEMA2.TABLE1 . . .

In some embodiments, the model replicator 302 may operate autonomously. In other embodiments, the model replicator 302 may operate in response to the user. For example, in autonomous mode, when the model replicator 302 receives the data model 108, the model replicator may be able to determine whether or not the database system 100 contains other instances of the database schema (i.e., 104b) in addition to the instance (104a) designated by the data model. If there are additional database schema instances, the model replicator 302 may autonomously make a data model copy 308' of the data model 108 for each additional instance and associate the instance with the copy. If, on the other hand, the model replicator 302 operates in response to the user, then the model replicator may be invoked when the user specifies the particular instance of the database schema that they want to model.

The data view generator 306 may receive the data model 308 and generate a data view 310a which references data tables in the associated database schema 104a. Likewise, the data view generator 306 may receive the data model 308' and generate a data view 310*b* which references data tables in the associated database schema 104*b*.

In some embodiments, the data views 310*a*, 310*b* may be persisted in a database schema. Referring to FIG. 3, for example, a database schema 304 may store data view 310*a*. A user may execute the data view 310*a* to produce result tables 110*a* from data referenced in database schema 104*a*. Likewise, the database schema 304 may store data view 310*b*, and a user may execute data view 310*b* to produce output 110*b* from data referenced in database schema 104*b*.

Since the data model 308 uses data from database schema 104*a* and data model copy 308' uses data from database schema 104*b*, the data contained in respective result tables 110*a*, 110*b* generated by executing respective the data views 310*a*, 310*b* are likely to be different. However, because the data model copy 308' is a copy of data model 308, the names of the data views 310*a* and 310*b* will be identical. For example, if the data model 308 specifies a data view called ViewOnTotalSales, then the data view 310*a* will use the name ViewOnTotalSales and data view 310*b* would also use the name ViewOnTotalSales, thus creating a naming conflict.

In order to resolve this naming conflict so that the generated data views 310*a* and 310*b* can be stored in the same database schema 304, the model replicator 302, as part of refactoring the data model copy 308', may assign different names for data views specified in the data model copy. In some embodiments, for example, the model replicator 302 may append the suffix "_1" to data views referenced in the data model copy 308'. Thus, in our example above, the data view in data model copy 308' may be called ViewOnTotalSales_1. Accordingly, the data view 310*b* will use ViewOnTotalSales_1, rather than ViewOnTotalSales. In accordance with some embodiments, if additional copies of the data model 308 are made to accommodate instances in addition to instances 104*a* and 104*b*, then the model replicator 302 may modify the additional copies of the data model with incremented suffixes such as "_2", "_3", and so on.

Figure 4:
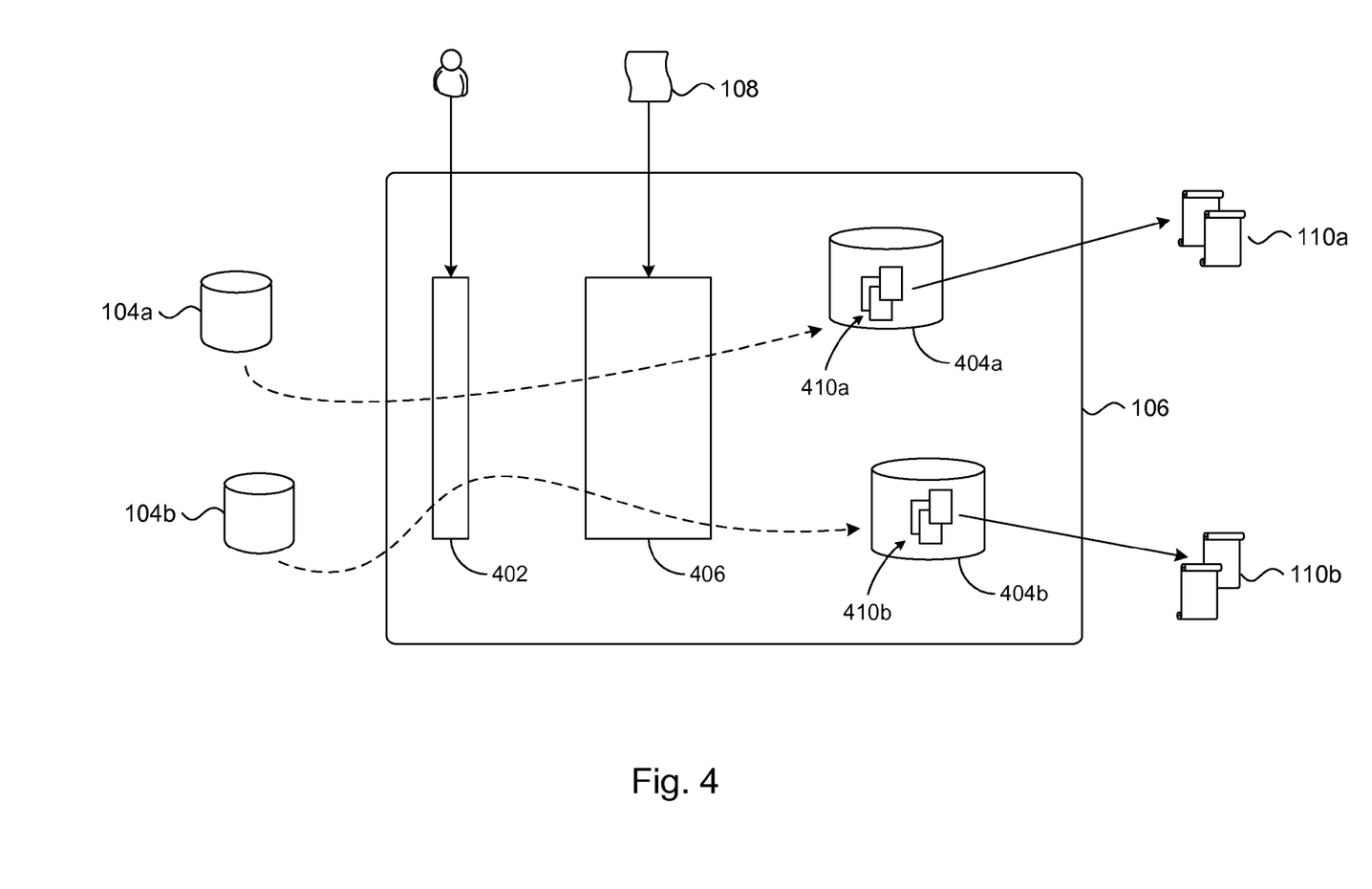
FIG. 4 shows another embodiment of the data model output manager.

Referring to FIG. 4, in some embodiments, the data model output manager 106 may comprise a selector 402, a data view generator 406, and multiple database schemas 404*a*, 404*b*. The data model 108 may designate one of the database schema instances 104*a* or 104*b*. In some embodiments, the data model 108 may refer to the database schema definition (e.g., its data dictionary) itself. When a user wishes to use the data model 108, the user may specify via the selector 402 which database schema (e.g., 104*a*, 104*b*) is to be modeled. In response, the selector 402 may access data either from database schema 104*a* or database schema 104*b*, and feed the user's selection to the data view generator 406, or otherwise inform the data view generator of the selected database schema.

The data view generator 406 may then apply the data model 108 to the selected database schema and generate corresponding data views 410*a* and 410*b*. As explained above, the data view generator 406 may perform a step of refactoring the data model 108 in order that references to the source data tables made in the data view refer to the data tables in the selected database schema.

In accordance with the principles of the present disclosure, the data view generator 406 may store the generated data view in a respective database schema. Thus, for example, data view 410*a* generated from data model 108 using data tables from instance 104*a* may be stored in database schema 404*a*. The data view 410*a* may then be executed by the user to produce output 110*a*. Likewise, data view 410*b* generated from the same data model 108 using data tables from instance 104*b* may be stored in a separate database schema 404*b*. The data view 410*b* may then executed to produce output 110*b*.

Figure 5:
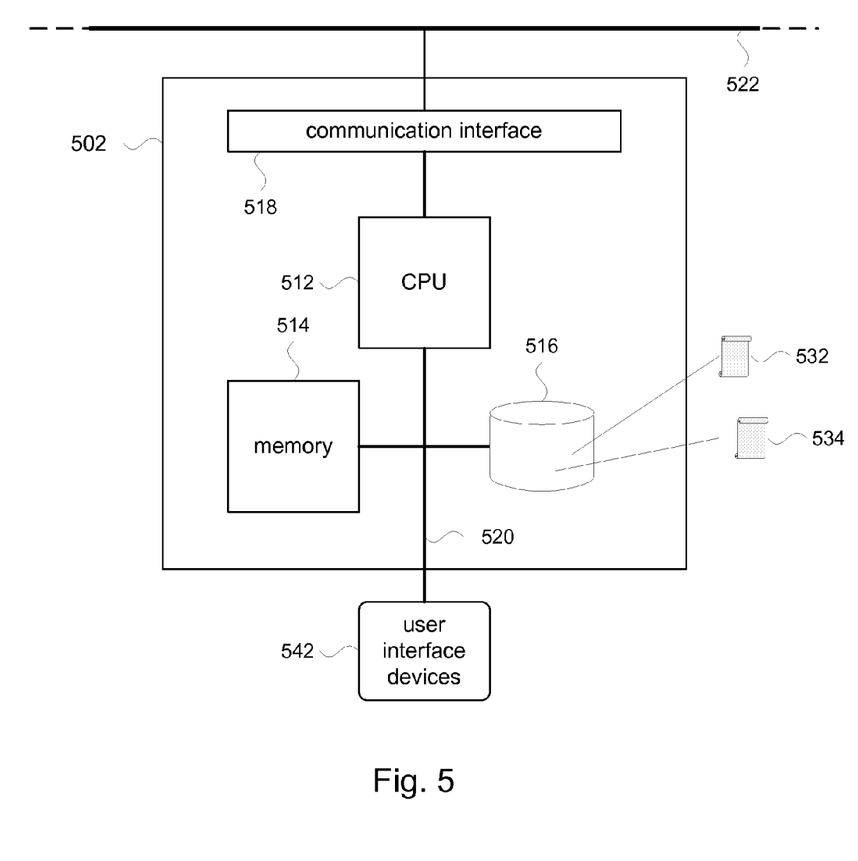
FIG. 5 shows an illustrative high level system diagram of a database system in accordance with the present disclosure.

A particular embodiment of the database system 100 in accordance with the present disclosure is illustrated in FIG. 5, showing a high level block diagram of a computer system 502 configured to operate in accordance with the present disclosure. The computer system 502 may include a central processing unit (CPU) 512 or other similar data processing component, including multiprocessor configurations. The computer system 502 may include various memory components. For example, the memory components may include a volatile memory 514 (e.g., random access memory, RAM) and a data storage device 516. A communication interface 518 may be provided to allow the computer system 502 to communicate over a communication network 522, such as a local area network (LAN), the Internet, and so on. An internal bus 520 may interconnect the components comprising the computer system 502. The data storage device 516 may comprise a non-transitory computer readable medium having stored thereon computer executable program code 532. The computer executable program code 532 may be executed by the CPU 512 to cause the CPU to perform steps of the present disclosure, for example the steps set forth in FIG. 2, or processing described in embodiments of the data model output manager 106 shown in FIG. 3 or FIG. 4. The data storage device 516 may store data structures 534 such as object instance data, runtime objects, and any other data described herein. In some embodiments, for example, the data storage device 516 may be a storage subsystem to provide the database 102 and to store database schemas 104*a*, 104*b*.

A user may interact with the computer system 502 using suitable user interface devices 542. They may include, for example, input devices such as a keyboard, a keypad, a mouse or other pointing device, and output devices such as a display.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. It will be appreciated that embodiments are not limited to any specific combination of hardware and software. Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A method in a database system comprising operating a computer system to perform steps of:
   receiving a data model which models data in a first database schema in the database system;
   using the received data model to generate a first data view of a first instance of the first database schema in the database system, including referencing one or more data tables comprising the first instance of the first database schema to generate the first data view; and
   using the received data model to generate a second data view of a second instance of the first database schema in the database system, including referencing one or more data tables comprising the second instance of the first database schema to generate the second data view.

2. The method of claim 1 wherein the first data view and the second data view are separate data views stored in an instance of a shared database schema.

3. The method of claim 2 wherein first result tables are generated from the first data view by accessing data stored in the one or more data tables in the first instance of the first database schema, wherein the second result tables are generated from the second data view by accessing data stored in the one or more data tables in the second instance of the first database schema.

4. The method of claim 1 wherein the received data model includes references that refer to the first instance of the first database schema, wherein the second data view is generated by:
   producing a copy of the received data model;
   modifying the references in the copy to refer to the second instance of the first database schema; and
   generating the second data view using the copy.

5. The method of claim 1 wherein the first data view is defined in an instance of a second database schema and comprises references to one or more of the data tables of the first instance of the first database schema and the second data view is defined in a third database schema and comprises references to one or more of the data tables of the second instance of the first database schema.

6. The method of claim 5 wherein the first data view is generated by associating the first instance of the first database schema with the received data model so that the received data model references the data tables from the first instance of the first database schema when the first data view is generated, wherein the second data view is generated by associating the second instance of the first database schema with the received data model so that the received data model references the data tables from the second instance of the first database schema when the second data view is generated.

7. The method of claim 1 wherein the first instance of the first database schema comprises data that has been migrated or replicated from a first source database separate from the database system and the second instance of the first database schema comprises data that has been migrated from a second source database separate from the database system.

8. A database system comprising:
   a computer system; and
   a data storage device having stored thereon executable program code which, when executed by the computer system, causes the computer system to:
      receive a data model which models data in a first database schema in the database system;
      use the received data model to generate a first data view of a first instance of the first database schema in the database system, including referencing one or more data tables comprising the first instance of the first database schema to generate the first data view; and
      use the received data model to generate a second data view of a second instance of the first database schema in the database system, including referencing one or more data tables comprising the second instance of the first database schema to generate the second data view.

9. The database system of claim 8 wherein the first data view and the second data view are separate data views stored in an instance of a shared database schema.

10. The database system of claim 9 wherein first result tables are generated from the first data view by accessing data stored in the one or more data tables in the first instance of the first database schema, wherein the second result tables are generated from the second data view by accessing data stored in the one or more data tables in the second instance of the first database schema.

11. The database system of claim 8 wherein the received data model includes references that refer to the first instance of the first database schema, wherein the second data view is generated by:
   producing a copy of the received data model;
   modifying the references in the copy to refer to the second instance of the first database schema; and
   generating the second data view using the copy.

12. The database system of claim 8 wherein the first data view is defined in an instance of a second database schema and comprises references to one or more of the data tables of the first instance of the first database schema and the second data view is defined in a third database schema and comprises references to one or more of the data tables of the second instance of the first database schema.

13. The database system of claim 12 wherein the first data view is generated by associating the first instance of the first database schema with the received data model so that the received data model references the data tables from the first instance of the first database schema when the first data view is generated, wherein the second data view is generated by associating the second instance of the first database schema with the received data model so that the received data model references the data tables from the second instance of the first database schema when the second data view is generated.

14. The database system of claim 8 wherein the first instance of the first database schema comprises data that has been migrated or replicated from a first source database separate from the database system and the second instance of the first database schema comprises data that has been migrated from a second source database separate from the database system.

15. A non-transitory computer-readable storage medium having stored thereon computer executable program code which, when executed on a computer system, causes the computer system to perform steps of:
   receiving a data model which models data in a first database schema in the database system;
   using the received data model to generate a first data view of a first instance of the first database schema in the database system, including referencing one or more data tables comprising the first instance of the first database schema to generate the first data view; and
   using the received data model to generate a second data view of a second instance of the first database schema in the database system, including referencing one or more data tables comprising the second instance of the first database schema to generate the second data view.

16. The non-transitory computer-readable storage medium of claim 15 wherein the first data view and the second data view are separate data views stored in an instance of a shared database schema.

17. The non-transitory computer-readable storage medium of claim 16 wherein first result tables are generated from the first data view by accessing data stored in the one or more data tables in the first instance of the first database schema, wherein the second result tables are generated from the second data view by accessing data stored in the one or more data tables in the second instance of the first database schema.

18. The non-transitory computer-readable storage medium of claim 15 wherein the received data model includes references that refer to the first instance of the first database schema, wherein the second data view is generated by:
    producing a copy of the received data model;
    modifying the references in the copy to refer to the second instance of the first database schema; and
    generating the second data view using the copy.

19. The non-transitory computer-readable storage medium of claim 15 wherein the first data view is defined in an instance of a second database schema comprising data from one or more of the data tables of the first instance of the first database schema and the second data view is defined in a third database schema comprising data from one or more of the data tables of the second instance of the first database schema.

20. The non-transitory computer-readable storage medium of claim 19 wherein the first data view is generated by associating the first instance of the first database schema with the received data model so that the received data model references the data tables from the first instance of the first database schema when the first data view is generated, wherein the second data view is generated by associating the second instance of the first database schema with the received data model so that the received data model references the data tables from the second instance of the first database schema when the second data view is generated.

* * * * *